Patented Apr. 24, 1973

3,729,454
METHOD OF POLYMERIZATION OF
VINYLTRIORGANOSILANES
Nikolai Sergeevich Nametkin, Leninsky prospekt 13, kv. 11; Sergei Garievich Durgarian, ulitsa Garibaldi 21, korpus 3, kv. 67; Valery Samuilovich Khotimsky, Konkovo-Derevlevo 1, Mikroraion, korpus 7, kv. 147; Vadim Ivanovich Kopkov, ulitsa Zelenogradskaya 25, korpus 2, kv. 194; and Iosif Efimovich Chernyakov, ulitsa Lobachevskogo 24, kv. 35, all of Moscow, U.S.S.R.
No Drawing. Filed Feb. 10, 1971, Ser. No. 114,352
Claims priority, application U.S.S.R., Feb. 16, 1970, 1,397,127
Int. Cl. C08f 1/68, 3/00
U.S. Cl. 260—80 PS                26 Claims

ABSTRACT OF THE DISCLOSURE

A method of polymerization of vinyltriorganosilanes residing in that said monomers are polymerized in the presence of dibutyl ether under the effect of dilithium silicon containing carbochain adducts prepared by reacting metallic lithium with a vinyltriorganosilane.

---

The present invention relates to the synthesis of high-molecular weight compounds, and more particularly to a method of polymerization of vinyltriorganosilanes. The process of polymerization of vinyltriorganosilanes proves to be of interest, since polymers based on vinyltriorganosilanes possess quite a number of important physico-technical properties that are valuable in practical application of these materials.

High absolute gas permeability of polyvinyltrimethylsilane and its good selectivity with respect to various gases make possible the use of membranes made of this material in apparatus for the enrichment and separation of various gas mixtures by diffusion techniques (cf. French Pat. No. 1,567,175).

Polyvinyltrimethylsilanes feature good compatibility with tissues of the living organism and are applicable in endoprosthetics (cf. U.S. patent application No. 51,745).

Known in the art is a method of polymerization of vinyltriorganosilanes on lithium and lithium alkylides in a hydrocarbon medium (cf. Author's Certificate of the U.S.S.R. No. 162,531, 1962; Bulletin of Inventions No. 10, 1964; N.S. Nametkin, S.G. Durgaryan, V.S. Khotimsky, Zhurnal Vysokomolekulrarnyje Sojedineniya/Journal of High-Molecular Compounds 7, No. 1 185, 1965; N.S. Nametkin, V.S. Khotimsky, S.G. Durgaryan, Doklady AN SSSR/Transactions of the Acad. Sci. of the U.S.S.R., 166,1188 (1966).

However, the preparation of high-polymers (with intrinsic viscosity of 1.5–2 dl./g.), having optimum physicotechnical properties, involves considerable time expenditures (thus, the polymerization on butyl- and ethyllithium takes 300–600 hrs.), so that the above-mentioned method is associated with technological inconveniences and the cost of the products is essentially increased.

Attempts at accelerating the process of polymerization of vinyltriorganosilanes by therefor having recourse to those techniques that usually accelerate the process of anionic polymerization of vinyl and diene hydrocarbon monomers (carrying out the polymerization in the presence of electron-donating substances such as ethers, tertiary amines and the like) failed to ensure the desired results, since the introducing of electron-donating additions proved to inhibit the process of polymerizing vinyltriorganosilanes under the effect of lithium alkyls.

The use of metallic lithium as an initiator in a hydrocarbon medium, when the polymer chain is known to propagate from the both ends simultaneously, has not resulted in the acceleration of the process of polymerization either (cf. N.S. Nametkin, S.G. Durgarian, V.S. Khotimskii, and V.I. Kopkov Dodlady AN SSSR/Transactions of the Acad. Sci. of the U.S.S.R./, vol. 185, No. 1, 97–99, 1969).

The object of the present invention is to provide a method of polymerization of vinyltriorganosilanes which would ensure an essential reduction of the time required for producing high-molecular vinyltriorganosilanes.

This object is accomplished by carrying out polymerization of vinyltriorganosilanes conforming to the general formula

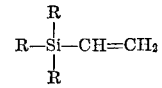

where R are the same or different alkyl radicals with the number of carbon atoms from 1 to 10, aryl or aralkyl radicals, under the effect of an initiator, namely, dilithium silicon-containing carbochain adducts, prepared by reacting metallic lithium with a vinyltriorganosilane (U.S. patent application Ser. No. 63,517 (filed Aug. 13, 1970), in the presence of electron-donating additions, such as dibutyl ether.

As monomers to be polymerized there can be cited vinyltrimethylsilane, vinylbenzyldimethylsilane, vinylpropyldimethylsilane, vinylamyldimethylsilane, vinylbutyldimethylsilane, vinylethyldimethylsilane, etc. The polymerization of vinyltriorganosilanes in accordance with the method of the invention can be effected in different ways. The process can be carried out either in mass of the monomer, or in hydrocarbon solvents such as pentane, hexane, heptane, nonane, decane cyclohexane, benzene, toluene, etc., or in their mixtures.

The temperature of the process, depending on the type of the selected monomer, can be from −50 to 100° C.

As an initiator use is made of dilithium silicon-containing carbochain adducts which are oligomeric products of interaction between metallic lithium and vinyltriorganosilanes conforming to the general formula

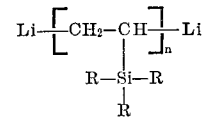

where R are the same or different alkyl radicals with the number of carbon atoms from 1 to 10, aryl or aralkyl radicals, and $n$ takes values from 2 to 30, preferably from 2 to 10.

Said adducts can actually exist as associates, agglomerates and other formations. They can be separated from the total reaction mass by filtering, decanting or by any other techniques in the form of easy-to-handle, mobile, transparent liquids.

As said initiators there can be cited dilithiumoligovinylphenyltrimethylsilane, dilithiumoligovinylphenyldimethylsilane, dilithiumoligovinylbenzyldimethylsilane.

Polymerization can be effected at molar ratios of the initiator to dibutyl ether ranging from 1:1 to 1:400.

As the process of polymerization in the presence of organolithium compounds is susceptible to various admixtures (oxygen, water, alcohols, etc.), high-purity monomers are to be used.

The process of polymerization can be carried out either under vacuum under a residual pressure of 10⁻⁵ mm. Hg, or in the atmosphere of a gas inert to organolithium compounds such as methane, argon, helium and the like.

The molar ratio of the initiator to the monomer can be varied within a wide range, depending on the desired molecular weight of the polymerization product.

For producing polymers with a high molecular weight said molar ratio should be from 1:1000 to 1:10000.

The carrying out of the polymerization of vinyltriorganosilanes under the effect of dilithium silicon-containing carbochain adducts prepared by reacting metallic lithium with a vinyltriorganosilane in the presence of dibutyl ether has made it possible to diminish the time required for producing high-molecular polyvinyltriorganosilanes down to 15–100 hours.

Thus, according to the invention, a 5 to 20-fold reduction of the time required for the polymerization of vinyltriorganosilanes is attained, as compared with the polymerization of the same monomers when initiated by lithium alkyls (e.g., by butyllithium).

For a better understanding of the present invention, given hereinbelow are examples, illustrating the realization of the herein-proposed method.

EXAMPLE 1

Polymerization of vinyltriorganosilanes in the medium of dibutyl ether under the effect of dilithiumoligovinyltrimethylsilane A vessel accommodating a thin-walled ampoule with 3 cu. cm. of a solution of dilithiumoligovinyltrimethylsilane in cyclohexane (0.0004 g.-equiv. of lithium) and equipped with a striker was charged with a product of distillation and condensation of 28.3 g. (0.217 mole) of dibutyl ether and 15 g. (0.15 mole) of vinyltrimethylsilane carried out under vacuum (at a molar ratio of the initiator to dibutyl ether of 1:375). The operations were carried out on a vacuum-distribution comb of the evacuation system ($10^{-3}$ mm. Hg). The reaction started after the ampoule containing the initiator, that is, dilithiumoligovinyltrimethylsilane, was broken by means of the striker at a temperature of 40° C. After a period of 50 hours the vessel was opened. The resulting polymer was removed from the vessel, dissolved in toluene, precipitated into methanol, washed with a 2% solution of HCl in methanol and dried in a vacuum dried to constant weight.

The polymer yield was 62%.

The intrinsic viscosity of the polymer obtained, as determined in cyclohexane at 25° C., was 1.7 dl./g.

EXAMPLE 2

Polymerization of vinyltrimethylsilane on dilithiumoligovinylphenyldimethylsilane The polymerization of vinyltrimethylsilane in a mixture of solvents, cyclohexane and dibutyl ether, was carried out by following the procedure described in Example 1. The concentration of dibutyl ether was 0.4 mole/lit., that of the monomer was 3 mole per lit.; the concentration of the initiator was 0.004 g.-equiv./l. (the initiator: dibutyl ether molar ratio being 1:100).

The polymerization time at a temperature of 40° C. was 56 hours.

The polymer yield was 71%.

The intrinsic viscosity of the polymer was 2.05 dl./g.

EXAMPLE 3

Polymerization of vinyltrimethylsilane on metallic lithium

The polymerization of vinyltrimethylsilane was carried out in the presence of a 30% suspension of lithium in paraffin in a reaction flask equipped with a stirrer, in a mixture of cyclohexane and dibutyl ether. The suspension was batched in an argon box. The monomers and solvents were batched in a stream of argon from Schlenk vessels or under vacuum by following the procedure described in Example 1. The concentration of lithium was 0.0051 mole/lit., the concentration of the vinyltrimethylsilane monomer was 3 mole/lit., and that of dibutyl ether was 0.2 mole/lit.

The polymerization time at 40° C. was 45 hours.
The polymer yield was 59.3%.
The intrinsic viscosity of the polymer was 1.93 dl./g.

EXAMPLE 4

Polymerization of vinylbutyldimethylsilane on dilithiumoligovinylbenzyldimethylsilane The polymerization of vinylbenzyldimethylsilane in a mixture of solvents, hexane and dibutyl ether, was carried out by following the procedure described in Example 1. The concentration of dibutyl ether was 0.8 mole/lit., that of dilithiumpolyvinylbenzyldimethylsilane was 0.005 g.-equiv./l. (at a molar ratio of the initiator to dibutyl ether of 1:160).

The polymerization time at 40° C. was 56 hours.
The polymer yield was 68%.
The intrinsic viscosity of the polymer was 1.41 dl./g.

EXAMPLE 5

Polymerization of vinylpropyldimethylsilane in cyclohexane on dilithiumoligovinyltrimethylsilane The polymerization of vinylpropyldimethylsilane was carried out by following the procedure described in Example 1.

The concentration of dibutyl ether was 0.35 mole/lit., of the monomer, 2.8 mole/lit., of the initiator, 0.004 g.-equiv. per lit. (The molar ratio of the initiator to dibutyl ether was 1:87).

The polymerization time at a temperature of 40° C. was 65 hours.
The polymer yield was 68%.
The intrinsic viscosity of the polymer was 1.5 dl./g.

EXAMPLE 6

Polymerization of vinylamyldimethylsilane in cyclohexane on dilithiumoligovinyltrimethylsilane The polymerization of vinylamyldimethylsilane was carried out by following the procedure described in Example 1.

The concentration of dibutyl ether 0.5 mole/lit., the concentration of the monomer 2.8 mole/lit., the concentration of the initiator 0.0036 g.-equiv./lit.

The polymerization time at a temperature of 40° C. was 70 hours.
The polymer yield was 68%.
The intrinsic viscosity of the polymer was 1.31 dl./g.

EXAMPLE 7

Polymerization of vinyltrimethylsilane in mass of monomer

The polymerization of vinyltrimethylsilane was carried out by following the procedure described in Example 1.

The concentration of the vinyltrimethylsilane monomer was 6.6 mole/lit.

The concentration of the dilithiumoligovinyltrimethylsilane initiator was 0.003 g.-equiv./lit.

The concentration of dibutyl ether was 0.015 mole/lit.

The molar ratio of the initiator to dibutyl ether was 1:50.

The polymerization temperature was 20° C.
The polymerization time was 50 hours.
The polymer yield was 68%.
The intrinsic viscosity of the polymer was 1.5 dl./g.

EXAMPLE 8

Polymerization of vinyltrimethylsilane on dilithiumoligovinyltrimethylsilane

The polymerization of vinyltrimethylsilane was carried out by following the procedure described in Example 1.

The concentration of dibutyl ether was 0.125 mole/lit.
The concentration of the monomer was 6.7 mole/lit.
The concentration of the initiator was 0.0025 g.-equiv./lit.

The polymerization time at a temperature of 40° C. was 15 hours.
The polymer yield was 80%.

The intrinsic viscosity of the polymer was 1.8 dl./g.

What is claimed is:

1. A method of polymerization of vinyltriorganosilanes of the general formula

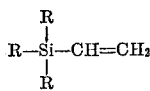

where R is selected from the group consisting of alkyls with from 1 to 10 carbon atoms aryls, aralkyls, comprising for polymerizing said vinyltriorganosilanes under the effect of initiators which are dilithium silicon containing-carbochain adducts prepared by reacting metallic lithium with a vinyltriorganosilane conforming to the general formula

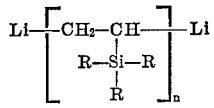

where R is as defined hereinabove and $n$ is from 2 to 30, in the presence of dibutyl ether taken in a molar ratio to said initiator from 1:1 to 400:1 at temperatures from $-50$ to $+100°$ C. in a hydrocarbon medium.

2. A method as claimed in claim 1, wherein the molar ratio of the initiator to dibutyl ether is from 1:50 to 1:100.

3. A method as claimed in claim 1, wherein said vinyltriorganosilane is vinyltrimethylsilane.

4. A method as claimed in claim 1, wherein said vinyltriorganosilane is vinylbenzyldimethylsilane.

5. A method as claimed in claim 1, wherein said vinyltriorganosilane is vinylpropyldimethylsilane.

6. A method as claimed in claim 1, wherein said vinyltriorganosilane is vinylamyldimethylsilane.

7. A method as claimed in claim 1, wherein polymerization is carried out at molar ratios of the vinyltriorganosilane to initiator from 1:1000 to 1:10000.

8. A method as claimed in claim 1, wherein polymerization of said vinyltriorganosilanes is carried out under vacuum at a residual pressure of down to $10^{-5}$ mm. Hg.

9. A method as claimed in claim 1, wherein polymerization of said vinyltriorganosilanes is carried out in an atmosphere of a gas inert to organolithium compounds, said gas being selected from the group consisting of argon, lithium, methane.

10. A method as claimed in claim 1, wherein said initiator is dilithiumoligovinyltrimethylsilane.

11. A method as claimed in claim 1, wherein said initiator is dilithiumoligovinylbenzyldimethylsilane.

12. A method as claimed in claim 1, wherein said initiator is dilithiumoligovinylphenyldimethylsilane.

13. A method as claimed in claim 1, wherein polymerization is carried out at temperatures ranging from 10 to 40° C.

14. A method of polymerization of vinyltriorganosilanes of the general formula

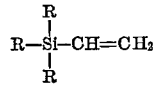

where R is selected from the group consisting of alkyls of from 1 to 10 carbon atoms aralkyls and aryls, comprising polymerizing said vinyltriorganosilanes under the effect of initiators that are dilithium silicon containing carbochain adducts prepared by reacting metallic lithium with a vinyltriorganosilane conforming to the general formula

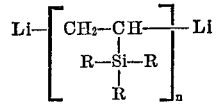

where R is as defined above and $n$ is from 2 to 30, in the presence of dibutyl ether taken in a ratio to the initiator of from 1:1 to 400:1 at temperatures ranging from $-50$ to $+100°$ C. in the mass of the monomer.

15. A method as claimed in claim 14, wherein the molar ratio of the initiator to dibutyl ether is within the range of from 1:50 to 1:100.

16. A method as claimed in claim 14, wherein said viniyltriorganosilane is vinyltrimethylsilane.

17. A method as claimed in claim 14, wherein said vinyltriorganosilane is vinylbenzyldimethylsilane.

18. A method as claimed in claim 14, wherein said vinyltriorganosilane is vinylamyldimethylsilane.

19. A method as claimed in claim 14, wherein said vinyltriorganosilane is vinylpropyldimethylsilane.

20. A method as claimed in claim 14, wherein polymerization is carried out at molar ratios of the vinyltriorganosilane to the initiator ranging from 1:1000 to 1:10000.

21. A method as claimed in claim 14, wherein polymerization of said vinyltriorganosilanes is carried out under vacuum at a residual pressure of down to $10^{-5}$ mm. Hg.

22. A method as claimed in claim 14, wherein polymerization of said vinyltriorganosilanes is carried out in an atmosphere of a gas inert to organolithium compounds said gas being selected from the group consisting of argon, helium, methane.

23. A method as claimed in claim 14, wherein said initiator is dilithiumoligovinyltrimethylsilane.

24. A method as claimed in claim 14, wherein said initiator is dilithiumoligovinylbenzyldimethylsilane.

25. A method as claimed in claim 14, wherein said initiator is dilithiumoligovinylphenyldimethylsilane.

26. A method as claimed in claim 14, wherein polymerization is carried out at temperatures ranging from 10 to 40° C.

References Cited

UNITED STATES PATENTS 3,468,972   9/1969   Hsieh _____ 260—836

FOREIGN PATENTS 162,531   10/1964   U.S.S.R. _____ 260—80
1,046,315   12/1958   Germany _____ 260—80

OTHER REFERENCES

Namet Kin, N. S., et al.: Dokl. Akad. Nauk. SSSR (1969), 185(1), 97–9 (Chem. Abst., 71, 3677c).

JAMES A. SEIDLECK, Primary Examiner
C. A. HENDERSON, JR., Assistant Examiner

U.S. Cl. X.R.

3—1; 128—68; 260—33.2 S B